UNITED STATES PATENT OFFICE.

R. P. WILLIAMS AND LEWIS WORSHAM, OF ALAMEDA, CALIFORNIA.

IMPROVEMENT IN PROCESSES OF WELDING COPPER.

Specification forming part of Letters Patent No. 207,145, dated August 20, 1878; application filed March 18, 1878.

*To all whom it may concern:*

Be it known that we, R. P. WILLIAMS and LEWIS WORSHAM, of Alameda, in the county of Alameda and State of California, have invented or discovered a new Process of Welding Copper; and we do hereby declare that the ingredients used and the manner of compounding the same, together with the best mode which we have devised for performing or carrying out said process, are fully described in the following specification.

By the means and method hereinafter described we have succeeded in producing a firm and perfect union of the metal at the joints or edges, that renders the same of great practical value in the many purposes to which this metal can be put.

In the application of our method or process the edges of the copper are first chamfered to form a smooth scarf-joint, and this part is then held together and brought to a cherry-red heat in the furnace or forge, when it is treated with a compound composed of the following ingredients, mechanically mixed and incorporated in about the proportions named: one pound of borax, more or less; one-half tea-spoonful of powdered sulphur; one-half tea-spoonful of salt; one-half tea-spoonful of dry oxalic acid.

This compound is applied to the lap-weld in the same manner as fluxes are used in welding steel or iron, and the metal is then put back in the forge and kept till it assumes a white heat, when it is placed on the anvil and welded by hammering, as in the usual manner of welding other metals.

Having thus fully described our invention, what we claim as new, and desire to secure by Letters Patent, is—

1. The herein-described process of welding copper, consisting in heating and treating the joint to be welded in the manner and with the compound substantially as herein described and specified.

2. The herein-described compound, composed of borax, salt, sulphur, or any equivalents thereof, and oxalic acid, in about the proportions herein specified, for the purpose set forth.

In testimony that we claim the foregoing we have hereunto set our hands and seals this 22d day of January, 1878.

R. P. WILLIAMS. [L. S.]
LEWIS WORSHAM. [L. S.]

Witnesses:
C. W. M. SMITH,
EDWARD E. OSBORN.